(12) United States Patent
Brooks et al.

(10) Patent No.: US 12,226,917 B2
(45) Date of Patent: Feb. 18, 2025

(54) ITEM FEATURE ACCOMMODATION

(71) Applicant: RightHand Robotics, Inc., Somerville, MA (US)

(72) Inventors: Joel Brooks, Arlington, MA (US); Mark Keck, Woburn, MA (US); Lael Odhner, Medford, MA (US)

(73) Assignee: RightHand Robotics, Inc., Charlestown, MA (US)

( * ) Notice: Subject to any disclaimer, the term of this patent is extended or adjusted under 35 U.S.C. 154(b) by 452 days.

(21) Appl. No.: 17/429,983

(22) PCT Filed: Mar. 3, 2020

(86) PCT No.: PCT/US2020/020790
§ 371 (c)(1),
(2) Date: Aug. 11, 2021

(87) PCT Pub. No.: WO2020/180863
PCT Pub. Date: Sep. 10, 2020

(65) Prior Publication Data
US 2022/0097237 A1    Mar. 31, 2022

Related U.S. Application Data

(60) Provisional application No. 62/814,343, filed on Mar. 6, 2019.

(51) Int. Cl.
*B25J 9/16* (2006.01)

(52) U.S. Cl.
CPC .......... *B25J 9/1697* (2013.01); *B25J 9/1661* (2013.01); *G05B 2219/40269* (2013.01); *G05B 2219/50391* (2013.01)

(58) Field of Classification Search
None
See application file for complete search history.

(56) References Cited

U.S. PATENT DOCUMENTS

| | | | |
|---|---|---|---|
| 2016/0221187 A1* | 8/2016 | Bradski | B25J 9/1664 |
| 2017/0225330 A1* | 8/2017 | Wagner | B07C 3/008 |
| 2018/0243904 A1* | 8/2018 | Bradski | B65G 47/46 |
| 2018/0330134 A1 | 11/2018 | Wagner et al. | |

OTHER PUBLICATIONS

International Search Report for PCT/US2020/020790, Jun. 18, 2020, 2 pages.
Written Opinion for PCT/US2020/020790, Jun. 18, 2020, 3 pages.
Extended European Search Report for European Application No. 20765563.0, PCT/US2020/020790, Nov. 7, 2022, 8 pages.

* cited by examiner

*Primary Examiner* — Nancy Bitar
(74) *Attorney, Agent, or Firm* — Danielson Legal LLC

(57) ABSTRACT

Robotic picking devices and methods for performing a picking operation. The disclosed methods may involve executing an imagery analysis procedure to identify a feature of interest of an item, wherein the feature of interest may affect a picking device's ability to perform a picking operation, and generating a grasping plan executable by the picking device, wherein the grasping plan accommodates the feature of interest so that the picking device is able to perform the picking operation.

10 Claims, 3 Drawing Sheets

ITEM FEATURE ACCOMMODATION

CROSS REFERENCE TO RELATED APPLICATIONS

The present application is the national phase of International (PCT) Patent Application No. PCT/US2020/020790, filed internationally on Mar. 3, 2020, and claims the benefit of and priority to co-pending U.S. provisional application No. 62/814,343, filed on Mar. 6, 2019, the entire disclosure of which is incorporated by reference as if set forth in its entirety herein.

TECHNICAL FIELD

Embodiments described herein generally relate to robotic devices and methods and, more particularly but not exclusively, to robotic devices and methods for performing picking operations.

BACKGROUND

Logistic operations such as those in warehouse environments often include robotic picking devices to gather items from a first location (e.g., a container) and place the items at a second location (e.g., on a conveyor belt).

Accordingly, these operations require the robotic picking device to first successfully grasp the item. Oftentimes, however, the item includes one or more features that may affect the picking device's ability to grasp the item.

For example, many order fulfillment applications require scanning a barcode associated with each item before processing. If an item is grasped in such a way that its barcode is obscured, the picking operation may not be accomplished as intended.

Existing techniques for identifying these features involve detecting pixel-level features in imagery of the item, wherein the features (e.g., intensity gradients, spatial frequencies, etc.) are specific to the structure of the type of item that is the subject of the operation. These techniques often require that these features are oriented to face the camera, with no occlusions, and with little variation in type, shape, and lighting. These techniques are also primarily used in applications in which it is assumed that these features are prominently shown in gathered imagery. Accordingly, these existing techniques are unable to accommodate items and various features in all scenarios.

A need exists, therefore, for systems and methods for performing picking operations that overcome the disadvantages of existing techniques.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method for performing a picking operation. The method includes receiving imagery of a first item to be grasped by a picking device in the picking operation; executing, using a processor executing instructions stored on memory, an imagery analysis procedure to identify a feature of interest of the first item, wherein the feature of interest may affect the picking device's ability to perform the picking operation; and generating, using the processor, a grasping plan executable by the picking device, wherein the grasping plan accommodates the feature of interest so that the picking device is able to perform the picking operation.

In some embodiments, the method further includes executing the generated grasping plan using the picking device.

In some embodiments, the feature of interest of the first item is a scannable indicia, and the generated grasping plan instructs the picking device to grasp the first item to ensure the scannable indicia can be scanned. In some embodiments, the generated grasping plan involves the picking device perturbing the first item so that the picking device can grasp the first item to ensure the scannable indicia can be scanned.

In some embodiments, the feature of interest of the first item is a structural component, and the generated grasping plan instructs the picking device to contact the structural component or to not contact the structural component. In some embodiments, the generated grasping plan involves the picking device perturbing the first item so that the picking device can contact the structural component or so that the picking device can grasp the first item without contacting the structural component.

In some embodiments, executing the imagery analysis procedure includes dividing the received imagery into a plurality of segments and ranking each of the plurality of segments as candidate grasping sites based on a likelihood that each of the plurality of segments contain the feature of interest.

In some embodiments, the method further includes moving at least a second item in order for the picking device to access the first item to perform the picking operation in accordance with the generated grasping plan.

In some embodiments, executing the imagery analysis procedure involves executing a machine learning procedure to identify the feature of interest of the first item.

According to another aspect, embodiments relate to a system for performing a picking operation. The system includes an interface for receiving imagery of a first item to be grasped; a picking device configured to grasp the first item in a picking operation; and a processor executing instructions stored on memory and configured to execute an imagery analysis procedure to identify a feature of interest of the first item, wherein the feature of interest may affect the picking device's ability to perform the picking operation, and generate a grasping plan executable by the picking device, wherein the grasping plan accommodates the feature of interest so that the picking device is able to perform the picking operation.

In some embodiments, the picking device is configured to grasp the first item in the picking operation by executing the generated grasping plan.

In some embodiments, the feature of interest of the first item is a scannable indicia, and the picking device is configured to grasp the first item to ensure the scannable indicia can be scanned in accordance with the generated grasping plan. In some embodiments, the picking device is configured to perturb the first item so that the picking device can grasp the first item to ensure the scannable indicia can be scanned in accordance with the generated grasping plan.

In some embodiments, the feature of interest of the first item is a structural component of the first item, and the picking device is configured to contact the structural component in accordance with the generated grasping plan or configured to not contact the structural component in accordance with the generated grasping plan. In some embodiments, the picking device is configured to perturb the first item so that the picking device can contact the structural component in accordance with the generated grasping plan or to not contact the structural component in accordance with the generated grasping plan.

In some embodiments, the processor executes the imagery analysis procedure by dividing the received imagery into a plurality of segments and ranking each of the plurality of segments as candidate grasping sites based on a likelihood that each of the plurality of segments contain the feature of interest.

In some embodiments, the picking device is further configured to move at least a second item in order to access the first item in accordance with the generated grasping plan.

In some embodiments, the processor executes the imagery analysis procedure by executing a machine learning procedure to identify the feature of interest of the first item.

BRIEF DESCRIPTION OF DRAWINGS

Non-limiting and non-exhaustive embodiments of this disclosure are described with reference to the following figures, wherein like reference numerals refer to like parts throughout the various views unless otherwise specified.

DETAILED DESCRIPTION

Figure 1:
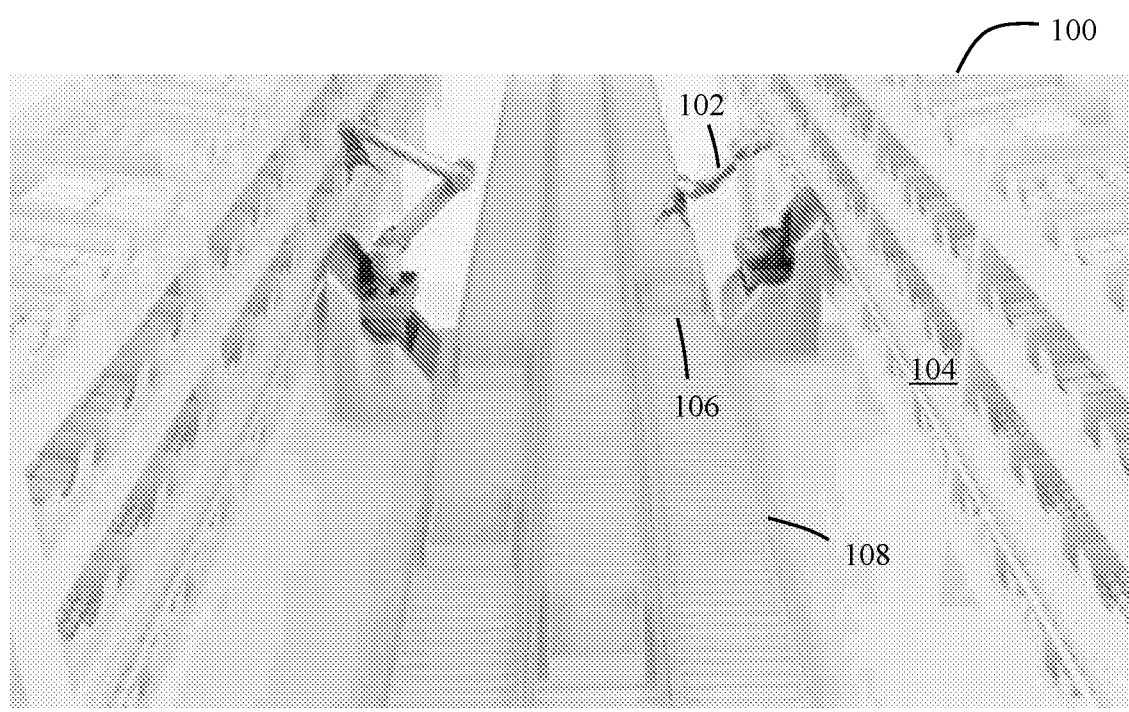
FIG. 1 illustrates a picking device in a warehouse environment in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment. The appearances of the phrase "in some embodiments" in various places in the specification are not necessarily all referring to the same embodiments.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Picking operations generally involve a robotic picking device executing a grasp attempt to grasp an item (e.g., from a shelf, container, bin, or the like), and then placing the item at another location. The "place" "location" may be another container, bin, conveyor belt, or the like. The types of pick and place locations may vary and may depend on the application or the environment in which the picking operation is to be performed.

As discussed previously, items the subject of picking operations often include certain features of interest that may affect whether the picking device is able to perform (or how the picking device should perform) the picking operation. For example, many order fulfillment applications require scanning a barcode associated with each item before processing. If an item is grasped in such a way that its barcode is obfuscated, the picking operation may not be accomplished as intended. In these situations, a human operator may need to intervene to adjust the item or may even need to perform the picking operation themselves. This inevitably contributes to down time and consumes resources as a human operator is required to intervene.

The embodiments described herein provide novel systems and methods for performing a picking operation. The systems and methods described herein may first determine whether an item to be grasped includes one or more features of interest. In the context of the present application, the term "feature of interest" or the like may refer to characteristics of items that affect how the picking device should execute a grasp attempt. In some scenarios, a feature of interest may refer to some characteristic that should be avoided during a picking operation. This may refer to a barcode, label, or some other indicia on the exterior of the item that should not be obfuscated by the grasping device. As another example, a feature of interest that should be avoided may be some location on the item that has a sensitive component (e.g., the tab on a soda can, glass, etc.).

In other scenarios, a feature of interest may refer to a location or structural component that should be contacted during a picking operation. These may refer to apertures, hooks, flat surfaces, or any other type of location or structure that should be contacted during the grasping attempt to increase the likelihood of a successful grasping attempt.

If an item includes one or more features of interest, the systems and methods described herein may generate a grasping plan that accommodates any features of interest and is executable by the picking device. Accordingly, these features of interest may be leveraged to improve the picking process or otherwise to increase the likelihood of a successful picking operation.

The devices and methods described herein may be implemented in a number of environments and for a number of applications. FIG. 1 illustrates a warehouse environment 100 in which one or more picking devices 102 may be tasked with performing pick-and-place operations. For example, the gripping device 102 may comprise an arm portion (e.g., formed of a plurality of arm segments or links) and an end effector and may be tasked with picking an item from a shelving unit 104 and placing the item in a container 106. The container 106 may be on conveyor belt 108 configured to move the container 106 to and from the gripping device 102. Additionally or alternatively, the picking device 102 may be tasked with picking items from the container 106 and placing the items in a shelving unit 104, put wall, storage location, another bin or container, or the like.

Figure 2:
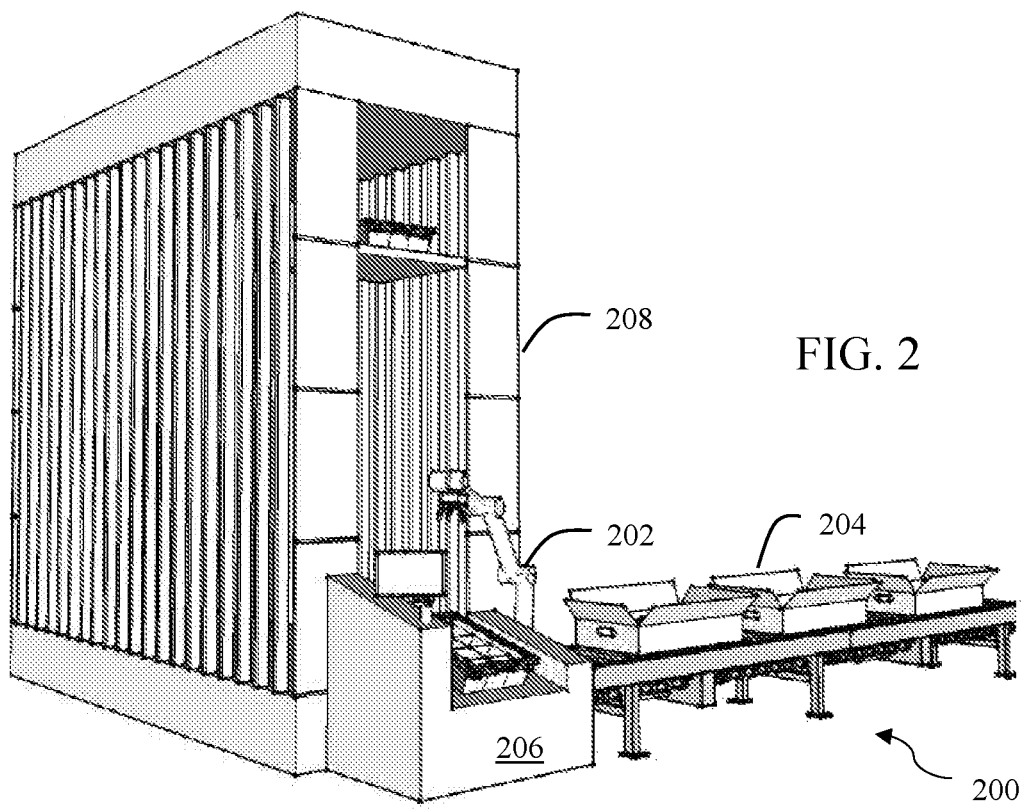
FIG. 2 illustrates a picking device in a warehouse environment in accordance with another embodiment.
Figure 3:
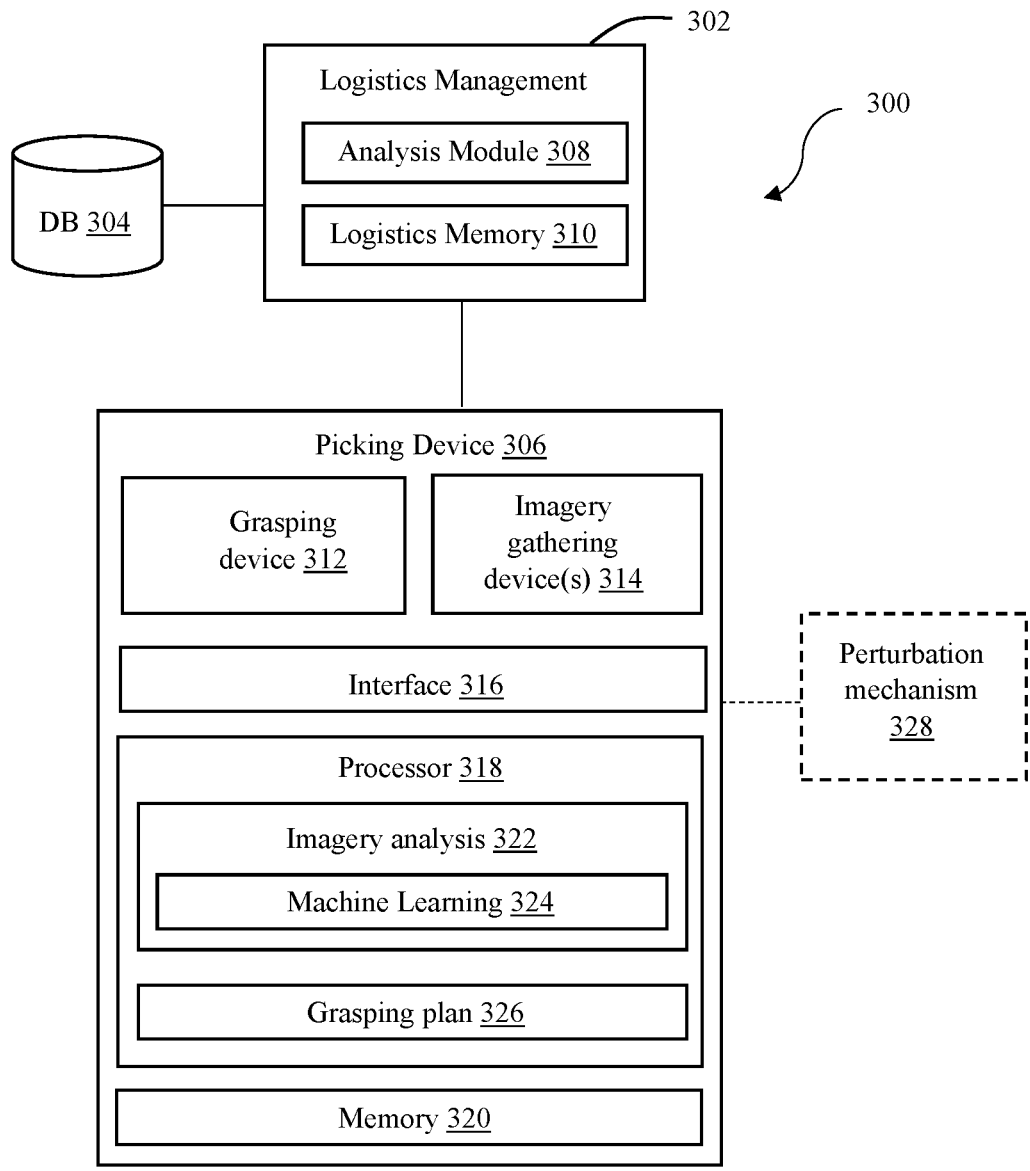
FIG. 3 illustrates a system for performing a picking operation in accordance with one embodiment.

FIG. 2 illustrates another exemplary application in a warehouse environment 200 in which a picking device 202 may be tasked with picking items from one or more containers 204, and placing the items at a loading station 206. These items may then be placed in a shipping container 208 for further shipment, sorting, processing, or the like FIG. 3 illustrates a system 300 for performing a picking operation in accordance with one embodiment. The system 300 may include a logistics management module 302, one or more databases 304, and a picking device 306.

The logistics management module 302 may be a processing device and may include or otherwise execute an analysis module 308 and instructions stored on logistics memory 310. The logistics management module 302 may be in operable communication with the database(s) 304. The database(s) 304 may store data regarding, for example, items commonly grasped and their associated features of interest (if any), results of previous pick attempts and picking operations, grasping plans or picking strategies, or the like.

The analysis module 308 may execute instructions stored in logistics memory 310 to perform any required analysis (e.g., if not performed by the picking device 306). These analyses may involve analyzing received imagery to determine whether the picking device 306 has any features of interest, whether the picking device 306 has grasped an item, generate a grasping plan, or the like.

One or more networks may link the various assets and components 302-06. The network(s) may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network(s) may also comprise, include, or interface to any one or more of a Wireless Application Protocol (WAP) link, a Wi-Fi link, a microwave link, a General Packet Radio Service (GPRS) link, a Global System for Mobile Communication G(SM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based link.

The picking device 306 may be tasked with performing one or more picking operations. As discussed previously, picking operations generally involve a picking device gathering an item from a first location and placing the item at a second location. In accordance with the embodiments described herein, the picking device 306 may include at least one grasping device 312 for grasping an item as part of a picking operation.

The grasping device 312 may be configured in a variety of ways and may depend on the item(s) to be picked. In some embodiments, the grasping device 312 may be configured as an end effector with a plurality of finger portions. In these embodiments, the picking device 306 may grasp an item by positioning the end effector near the item so that the finger portions are on opposite sides of the item, and then closing the finger portions so that they come into contact with the item. If the finger portion(s) apply a sufficient amount of force to the item, they can then pick up and move the item to another location in accordance with the requirements of a picking operation.

In other embodiments, the grasping device 312 may be configured as one or more suction devices that generate a suction force to obtain a grasp on an item. In these embodiments, the grasping device 312 may further include any required vacuum generators and tubing to provide the required suction force.

In operation, the picking device 306 may move the suction device(s) sufficiently close to the item or otherwise to be in contact with the item such that the generated suction force causes the item to stay in contact with the suction device. Once grasped, the suction device may move the item to the desired location. The suction force may be stopped or reduced so that the suction device(s) release the item at the desired location.

The picking device 306 may further include, be configured with, or otherwise be in communication with one or more imagery gathering devices 314. These imagery gathering devices 314 may be directed towards item(s) to be picked and may gather imagery regarding an item such as the item's orientation, configuration, location, or other type of information that may help determine whether the object that is the subject of the picking operation includes any features of interest.

These imagery gathering devices 314 may include, for example and without limitation, any one or more of RGB cameras, stereoscopic cameras, LIDAR, sonar sensors, etc. The exact type or configuration of the imagery gathering devices 314 used may vary and may include any type of sensor device whether available now or invented hereafter as long as they can gather data required to accomplish the objectives of the embodiments described herein.

The location or placement of the imagery gathering devices 314 may vary as well, and may depend on the type of imagery gathering devices 314 used. For example, if the grasping device 312 is configured as an end effector with finger portions, one or more imagery gathering devices 314 may be embedded in the palm of the end effector.

The system 300 may, in some embodiments, use off-the-shelf (OTS) RGB cameras to gather imagery of items targeted by the picking device 306. These cameras may be operably placed to provide an overhead view of the picking area. Regardless of the exact configuration, the gathered imagery may be utilized in real-time by the system 300 for feature accommodation (e.g., avoidance) and also stored for training and refinement of any implemented image analysis techniques such as machine learning procedures.

An interface 316 may receive the gathered imagery and communicate the gathered imagery to a processor 318 for analysis. The processor 318 may execute instructions stored on memory 320 to analyze the received imagery. The memory 320 may be L1, L2, L3 cache, or RAM memory configurations. The memory 320 may include non-volatile memory such as flash memory, EPROM, EEPROM, ROM, and PROM, or volatile memory such as static or dynamic RAM, as discussed above. The exact configuration/type of memory 320 may of course vary as long as instructions for performing the steps of the claimed embodiments can be executed by the processor 318.

Specifically, the processor 318 may execute one or more imagery analysis modules 322 to determine whether an item has any features of interest. For example, the imagery analysis module 322 may use one or more machine learning procedures 324 to identify features of interest in the gathered imagery. These procedures may use raw RGB imagery as an input and produce an output that contains a predicted probability of each pixel belonging to a feature of interest of the item in the imagery.

In some embodiments, the machine learning procedure(s) 324 executed by the imagery analysis module 322 may be supervised and rely on previously-annotated imagery stored in one or more databases 304. For example, each "training" image may have regions containing features of interest that are labeled at the pixel level. These may have been labeled by a user as part of a training phase, for example.

A standalone semantic segmentation labeling tool (not shown in FIG. 3) may be used to create annotations for the training images. Users of this tool may be presented images from a training set of images. They may then indicate a bounding polygon or other designation over each feature in the imagery.

For example, if the item in a training image includes a barcode, the user may highlight the barcode to designate bar codes as a feature of interest. Specifically, the user may designate bar codes as a feature of interest that should not be covered during a picking operation.

As another example, if the item in a training image is a can with a tab (e.g., a beverage can), the user may highlight the tab as a feature of interest that should not be contacted during picking operations.

As yet another example, if the item in a training image includes a flat surface, the user may highlight the flat surface as a feature of interest that a suction device should contact during execution of a picking operation (i.e., if the grasping device 312 is configured with one or more suction devices). As yet another example, if the item in a training image includes some type of an aperture, slot, or hook that, if engaged would make it easier for the grasping device 312 to grasp the item, then the user may designate these components as features of interest that should be contacted during a grasp attempt.

Imagery may be collected from a variety of items and picking setups to increase the generalizability of any implemented machine learning procedures 324. Image preprocessing techniques such as scaling, rotations, and lighting changes may make the machine learning procedure(s) 324 robust to variations in actual picking environments and various physical properties of the items.

Since features of interest to be avoided are commonplace on many everyday objects, users do not need to be familiar with the picking device 306 or target items in order to accurately identify these features of interest in the training images. Accordingly, this allows users of, for example, crowdsourcing platforms to produce labeled training images used by the imagery analysis module 322.

The grasping plan module 326 may execute instructions stored in memory 320 to then generate a grasping plan to be executed by the picking device 306. The grasping plan, if appropriately executed by the picking device 306, should enable the grasping device 306 to grasp the item in a way that features of interest to be avoided are not contacted or covered. Additionally or alternatively, the grasping plan may specifically designate features of interest of the item that should be contacted by the picking device 306.

Accordingly, the picking device 306 may integrate output from the imagery analysis module 322 into its decision making process for choosing one or more grasping sites. In some embodiments, the grasping plan module 326 may assign and adjust rankings of candidate or potential grasping sites based on the likelihood of that site containing a feature of interest. For example, the grasping plan module 326 designates that picking sites with features of interest such as glass should preferably be avoided or entirely avoided. These decisions can be influenced by the procedure's confidence in the predicted areas of the imagery, as well as knowledge of the items themselves.

That is, prior knowledge regarding the items may be considered as well. For example, the database(s) 304 may store data regarding an item's weight, shape, length, width, depth, contents, surface coefficient of friction, configuration (e.g., whether the item has any specific locations ideal for grasping), deformability, or any other type of data or characteristics that may affect how the grasping device should grasp the item to accommodate any features of interest.

Additionally, the size and configuration of the grasping device 312 may be accounted for to ensure that the grasping device 312, when grasping the item, does not contact or obfuscate a feature of interest to be avoided. In the case of barcodes, this would allow unoccluded scanning, or in the case of features like tabs on cans, it would allow the grasping device 312 to successfully grasp the item at a higher frequency.

If the grasping device 312 is configured as an end effector with finger portions, this configuration and size data may relate to how many finger portions are included, the positions of the finger portions on the end effector with respect to other finger portions, the size of the finger portions (e.g., their length, width), compliance, material, bend point(s), range of motion, or any other type of information that may affect how the picking device should grasp the item to accommodate any features of interest.

If the grasping device 312 is configured with a suction device, this configuration and size data may include the number of suction devices, the size of the suction device(s), the force generated, or any other type of information that may affect how the picking device should grasp the item to accommodate any features of interest.

Success in accommodating features of interest can be measured by the ability of the picking device 306 to, for example, pick up and scan an item on its first try (or otherwise successfully completing a picking operation). These metrics can be used to adjust how to best integrate the predictions from the imagery analysis module 322 into the grasping plan. They can also be used to automatically curate new informative inputs for refining the machine learning procedure 324. Many of the inabilities to pick and scan on first try may come from an inaccurate labeling of the features in the imagery. By annotating and training on images from unsuccessful attempts at scanning, the system's robustness can be further improved.

Referring back to FIG. 3, the system 300 may further include a perturbation mechanism 328 to perturb an item. For example, the item may be in a position or location in which the picking device 306 is unable to successfully perform the picking operation. Accordingly, a perturbation mechanism 328 may perform a perturbation operation such as those disclosed in Applicant's co-pending PCT Appl. No. PCT/US20/16967, filed on Feb. 6, 2020, the content of which is incorporated by reference as if set forth in its entirety herein. In some embodiments, the picking device 306 or the perturbation mechanism 328 may need to move another item first in order for the picking device 306 to grasp a desired item.

Figure 4:
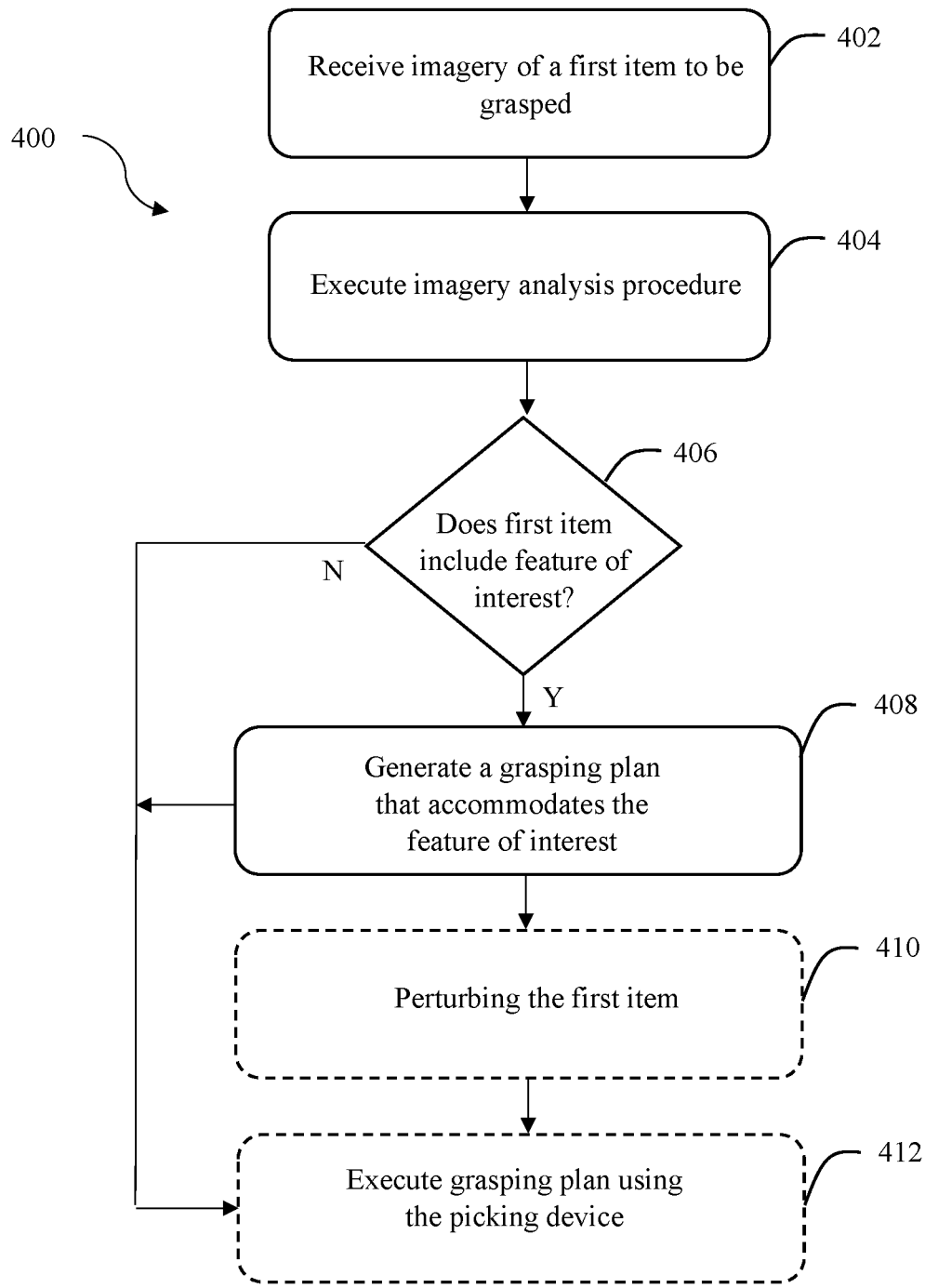
FIG. 4 depicts a flowchart of a method for performing a picking operation in accordance with one embodiment.

FIG. 4 depicts a flowchart of a method 400 for performing a picking operation in accordance with one embodiment. Step 402 involves receiving imagery of a first item to be grasped by a picking device in the picking operation. This imagery may be gathered by devices such as the imagery gathering devices 314 of FIG. 3. These devices may be configured as part of the picking device or separate from the picking device but operably positioned to gather imagery regarding the first item.

Step 404 involves executing, using a processor executing instructions stored on memory, an imagery analysis procedure to identify a feature of interest of the first item, wherein the feature of interest may affect the picking device's ability to perform the picking operation or how the picking device should perform the picking operation. As discussed previously, a feature of interest may refer to a component or location on an item that should not be contacted or covered during a picking operation.

If it is determined in step 406 that the picking device does not include any features of interest, the method 400 may proceed to step 412. Step 412 involves executing a grasping plan using the picking device. In this case, the grasping plan would not involve accounting for any features of interest.

If, however, it is determined in step 406 that the item includes a feature of interest, the method 400 may proceed to step 408. Step 408 involves generating, using the processor, a grasping plan executable by the picking device. In this case, the generated grasping plan accommodates the feature of interest so that the picking device is able to perform the picking operation. In some scenarios, the feature of interest should be avoided, not contacted, or otherwise not covered by the picking device. In these scenarios, the grasping plan may involve the picking device grasping the item in a way to avoid these features of interest.

In other scenarios, a feature of interest may be a location that should be contacted to increase the likelihood that the picking device is able to successfully perform the picking operation. In these scenarios the grasping plan may involve the picking device grasping the item to contact these features of interest.

If picking device is able to perform the picking operation, method 400 may proceed to step 412 and execute the grasping plan. In other cases, the item may be positioned in a way that the picking device is unable to perform the picking operation. In these cases, the method 400 may proceed to step 410 which involves perturbing the item as discussed above. Once the item is perturbed, the method 400 may proceed to step 412 and the picking device may execute the grasping plan.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method for performing a picking operation, the method comprising:
    receiving imagery of a first item to be grasped by a picking device in the picking operation; executing, using a processor executing instructions stored on memory, an imagery analysis procedure to identify a feature of interest of the first item by dividing the received imagery into a plurality of segments; and
    ranking each of the plurality of segments as candidate grasping sites based on a likelihood that each of the plurality of segments contain the feature of interest; wherein the feature of interest is a scannable indicia on the item and may affect the picking device's ability to perform the picking operation; and
    generating, using the processor, a grasping plan executable by the picking device, wherein the grasping plan accommodates the feature of interest so that the picking device is able to perform the picking operation, wherein the generated grasping plan instructs the picking device to grasp the first item in a way that ensures the scannable indicia on the item is not contacted or covered by the picking device so that the scannable indicia can be scanned for processing.

2. The method of claim 1 further comprising executing the generated grasping plan using the picking device.

3. The method of claim 1 wherein the generated grasping plan involves the picking device perturbing the first item so that the picking device can grasp the first item to ensure the scannable indicia can be scanned.

4. The method of claim 1 further comprising moving at least a second item in order for the picking device to access the first item to perform the picking operation in accordance with the generated grasping plan.

5. The method of claim 1 wherein executing the imagery analysis procedure involves executing a machine learning procedure to identify the feature of interest of the first item.

6. A system for performing a picking operation, the system comprising: an interface for receiving imagery of a first item to be grasped; a picking device configured to grasp the first item in a picking operation; and a processor executing instructions stored on memory and configured to:
    execute an imagery analysis procedure to identify a feature of interest of the first item by dividing the received imagery into a plurality of segments, and ranking each of the plurality of segments as candidate grasping sites based on a likelihood that each of the plurality of segments contain the feature of interest, wherein the feature of interest is a scannable indicia on the item and may affect the picking device's ability to perform the picking operation and generate a grasping plan executable by the picking device, wherein the grasping plan instructs the picking device to grasp the item in a way that ensures the scannable indicia on the item is not contacted or covered by the picking device so that the scannable indicia can be scanned for processing.

7. The system of claim 6 wherein the picking device is configured to grasp the first item in the picking operation by executing the generated grasping plan.

8. The system of claim 6 wherein the picking device is configured to perturb the first item so that the picking device can grasp the first item to ensure the scannable indicia can be scanned in accordance with the generated grasping plan.

9. The system of claim 6 wherein the picking device is further configured to move at least a second item in order to access the first item in accordance with the generated grasping plan.

10. The system of claim 6 wherein the processor executes the imagery analysis procedure by executing a machine learning procedure to identify the feature of interest of the first item.

* * * * *